US012719862B2

(12) United States Patent
Nainar et al.

(10) Patent No.: US 12,719,862 B2
(45) Date of Patent: Aug. 25, 2026

(54) TRANSPARENT AUTHENTICATION USING BIOMETRIC FACTORS

(71) Applicant: Cisco Technology, Inc., San Jose, CA (US)

(72) Inventors: Nagendra Kumar Nainar, Morrisville, NC (US); David John Zacks, Vancouver (CA); Carlos M. Pignataro, Cary, NC (US); Thomas Szigeti, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 583 days.

(21) Appl. No.: 17/886,411

(22) Filed: Aug. 11, 2022

(65) Prior Publication Data

US 2024/0054196 A1 Feb. 15, 2024

(51) Int. Cl.
*G06F 21/32* (2013.01)
*H04L 9/40* (2022.01)

(52) U.S. Cl.
CPC ...... *H04L 63/0861* (2013.01); *H04L 63/0853* (2013.01); *G06F 21/32* (2013.01)

(58) Field of Classification Search
CPC .. H04L 63/0861; H04L 63/0853; G06F 21/32
See application file for complete search history.

(56) References Cited

U.S. PATENT DOCUMENTS 9,223,956 B2 12/2015 Hong
10,057,227 B1 * 8/2018 Hess ........................ G06F 21/31
10,438,225 B1 * 10/2019 Reading ............. G06Q 30/0225
10,467,398 B1 * 11/2019 Derakhshani ........ G06V 40/172
10,701,067 B1 * 6/2020 Ziraknejad ............ H04W 12/63
2014/0337634 A1 * 11/2014 Starner ................. H04W 12/33 713/186
2015/0278498 A1 * 10/2015 Hong ...................... G06F 21/32 340/5.82
2015/0350201 A1 * 12/2015 Cornell ............... G06F 16/9535 726/7
2015/0365235 A1 * 12/2015 Hostyn ................. H04W 12/04 713/184
2016/0050203 A1 2/2016 Hefetz
2016/0072803 A1 * 3/2016 Holz ....................... G06F 21/42 726/7
2016/0250490 A1 * 9/2016 Hoffman ............ A61N 1/37254 607/60

(Continued)

OTHER PUBLICATIONS

Shrestha et al. "Listening Watch: Wearable Two-Factor Authentication using Speech Signals Resilient to Near-Far Attacks" WiSec '18, Jun. 18-20, 2018, Stockholm, Sweden (Year: 2018).*

(Continued)

*Primary Examiner* — David J Pearson
(74) *Attorney, Agent, or Firm* — Lee & Hayes, P.C.

(57) ABSTRACT

This disclosure describes techniques for authentication using wearable devices. An example method includes determining that a user is wearing a secondary device; determining that the secondary device has detected a signal output by a primary device; determining that the user has confirmed an authentication factor output by the primary device; and enabling the user to access a secured resource via the primary device.

19 Claims, 7 Drawing Sheets

(56) References Cited

U.S. PATENT DOCUMENTS

| | | | | |
|---|---|---|---|---|
| 2017/0094510 | A1 | 3/2017 | Khosravi et al. | |
| 2017/0264608 | A1* | 9/2017 | Moore | G07C 9/257 |
| 2017/0302659 | A1 | 10/2017 | Shteingart et al. | |
| 2017/0346817 | A1* | 11/2017 | Gordon | G06V 40/10 |
| 2018/0307322 | A1* | 10/2018 | Lopez Lecube | H04L 63/0853 |
| 2019/0044942 | A1 | 2/2019 | Gordon et al. | |
| 2019/0303553 | A1* | 10/2019 | Choiniere | G06F 21/32 |
| 2019/0386984 | A1* | 12/2019 | Thakkar | H04L 63/18 |
| 2021/0073362 | A1 | 3/2021 | Alameh | |
| 2021/0085988 | A1* | 3/2021 | Nin | G06F 21/629 |
| 2021/0150014 | A1* | 5/2021 | Edwards | G06F 40/279 |
| 2021/0184858 | A1 | 6/2021 | Perry | |
| 2022/0114248 | A1* | 4/2022 | Barros | G06F 21/44 |
| 2022/0138294 | A1* | 5/2022 | Neumann | H04L 43/02 713/186 |
| 2022/0309161 | A1* | 9/2022 | Bhide | G06F 21/57 |
| 2022/0366027 | A1* | 11/2022 | Hall | H04L 9/0866 |
| 2022/0414202 | A1* | 12/2022 | Tourani | G06F 21/35 |
| 2023/0021430 | A1* | 1/2023 | Goodsitt | H04L 9/0643 |
| 2023/0328057 | A1* | 10/2023 | Agarwal | H04L 63/083 726/7 |
| 2024/0163117 | A1* | 5/2024 | Lind | H04L 9/3234 |

OTHER PUBLICATIONS

PCT Search Report and Written Opinion mailed on Nov. 27, 2023 for International Application No. PCT/US2023/029998 from PCT Summary, 26 pages.

* cited by examiner

TRANSPARENT AUTHENTICATION USING BIOMETRIC FACTORS

TECHNICAL FIELD

The present disclosure relates generally to techniques for authenticating users using parameters detected by wearable devices.

BACKGROUND

Various computer security policies require authenticating a user as a prerequisite to the user accessing a secured resource, such as banking information, trade secrets, employment records, or other types of sensitive data. Particular policies require multi-factor authentication (MFA), wherein the user is authenticated only after confirming multiple authentication factors that are associated with the user. These factors may include things that the user knows (e.g., passwords) as well as things that the user has (e.g., access to a particular mobile phone). In some cases, the user is reauthenticated at a frequency that is defined by a reauthentication interval. For instance, a particular user may be required to re-enter a password and respond to a push notification every hour in order to maintain access to a secured resource.

Existing MFA techniques often require substantial user intervention in order to confirm the identity of a user operating a primary device in order to access a secured resource. For example, the user may have to manually type in a password, or respond to a push notification, at a predetermined frequency in order to maintain access to the secured resource. This level of intervention can be disruptive and/or irritating to the user. However, shortening the reauthentication interval may increase the likelihood that an unauthorized user can access the secured resource using the primary device. Thus, there is a need for techniques that can be used to frequently authenticate the user without intervention by the user.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 2A illustrates signaling un which a primary device and/or a user of the primary device is authenticated, such that the primary device is allowed to access a secured resource. FIG. 2B illustrates example signaling in which a user is not authenticated and is consequently denied access to the secured resource.

DESCRIPTION OF EXAMPLE EMBODIMENTS

Overview

Figure 1A:
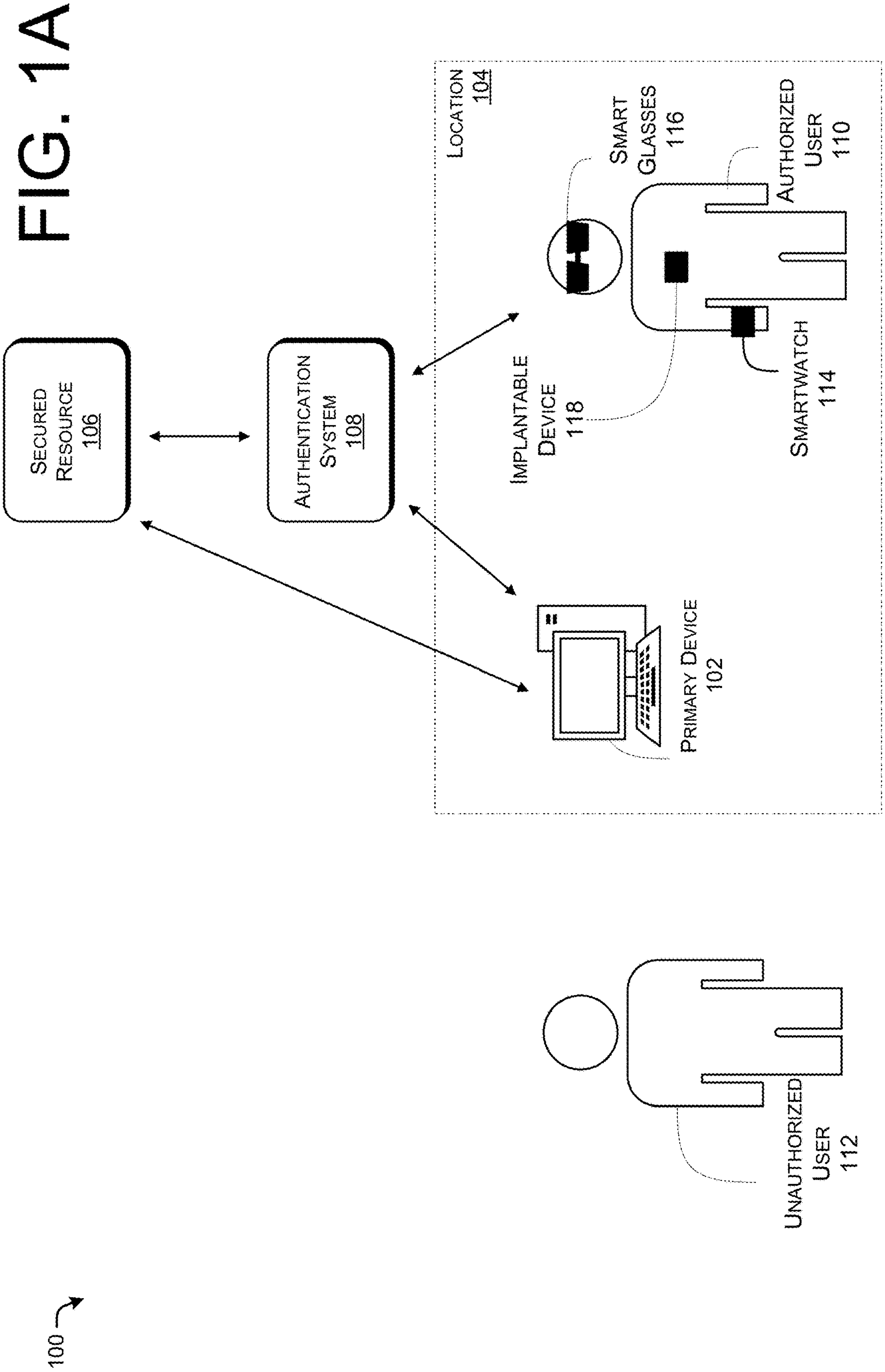
FIG. 1A illustrates an example environment for performing multi-factor authentication (MFA) in accordance with various implementations described herein.

This disclosure describes various techniques for authenticating users using wearable devices. An example method includes determining that a user is wearing a secondary device; determining that the secondary device has detected a signal output by a primary device; determining that the user has confirmed an authentication factor output by the primary device; and enabling the user to access a secured resource via the primary device.

In some examples, the secondary device includes a watch. For instance, the signal from the primary device includes at least one of a visual signal detected by a camera of the watch, an audible signal detected by a microphone of the watch, or a haptic signal detected by an accelerometer of the watch.

In some cases, the secondary device includes smart glasses. For instance, the signal from the primary device comprises at least one of a visual signal detected by a camera of the watch or an audible signal detected by a microphone of the watch.

According to some implementations, determining that the user is wearing the secondary device includes determining that the secondary device has detected a biometric signal from the user; and determining that the detected biometric signal matches a stored biometric signal associated with the user. For instance, the biometric signal includes least one of a retina scan, a pulse, an electrocardiogram (ECG), a blood oxygenation, a heart rate, or a voice of the user.

In various examples, the secondary device includes a camera and the signal from the primary device includes a quick response (QR) code output on a display of the primary device.

In some cases, the secondary device includes a microphone. For instance, the signal from the primary device includes an audible signal output by a speaker of the primary device.

According to various examples, the method is performed by at least one processor that is different than the primary device and different than the secondary device. For instance, the method is performed by at least one server.

EXAMPLE EMBODIMENTS

This disclosure describes various techniques for authenticating a user using biometric factors. In various implementations, the user at least attempts to access a secured resource using a primary device. In addition, the user may be associated with a secondary device that is wearable and/or implantable. An authentication system may confirm that the user is authorized to access the secured resource by communicating with the primary device and the secondary device. For example, the secondary device may confirm that the user is wearing the secondary device by detecting a biometric factor from the user, such as a retina shape, a heart rhythm, or some other physiological parameter and/or pattern that is specific to the authorized user. In some cases, the secondary device may also detect that it is in proximity to the primary device by detecting a signal from the primary device. Based on determining that the secondary device is worn by the user, and is in proximity to the primary device, the authentication system may confirm that the user operating the primary device is the authorized user.

Example techniques described herein are directed to specific technological improvements in the field of authentication. In particular, various implementations of the present disclosure can be used to accurately confirm the identity of a user without requiring the user to type in a password, respond to a push notification, or perform another type of manual intervention. Thus, secured resources can be adequately protected without interrupting the user's workflow, even using frequent reauthentication intervals.

Various implementations of the present disclosure will be described in detail with reference to the drawings, wherein like reference numerals present like parts and assemblies throughout the several views. Additionally, any samples set forth in this specification are not intended to be limiting and merely demonstrate some of the many possible implementations.

FIG. 1A illustrates an example environment 100 for performing multi-factor authentication (MFA) in accordance with various implementations described herein. As shown, a primary device 102 is positioned within a location 104. As used herein, the term "primary device," and its equivalents, may refer to an endpoint device that is receiving data from a resource, transmitting data to the resource, requesting to receive data from the resource, requesting to transmit data to the resource, or a combination thereof. Examples of primary devices include mobile phones, tablet computers, personal computers, laptops, smart televisions, servers, certain Internet of Things (IoT) devices, and the like.

The location 104 may be a volume of space containing the primary device 102 and other objects, subjects, and so on. In some cases, the location 104 is a room of a building. For example, the location 104 may be defined according to one or more walls, a floor, a ceiling, or a combination thereof. In various implementations, the boundaries of the location 104 may be within a threshold distance of the primary device 102, such as within five feet, ten feet, or the like.

In various implementations, individuals may selectively access a secured resource 106 by operating the primary device 102. As used herein, the terms "resource," "computing resource," and their equivalents, may refer to a hardware resource (e.g., a processor, memory, or the like), a software resource (e.g., a virtual machine (VM)), or a combination thereof. In various examples, the secured resource 106 may store or otherwise be configured to provide sensitive data. The secured resource 106 may include hardware, software, or a combination thereof.

In various examples, the secured resource 106 may store or otherwise be configured to provide sensitive data. As used herein, the term "sensitive data," and its equivalents, may refer to any confidential data whose access is at least partially restricted. For example, an enterprise may implement a security mechanism (e.g., a firewall) that prevents unauthorized users and/or devices from accessing the sensitive data. In some examples, an enterprise may implement a security mechanism that prevents unauthorized users and/or devices from transmitting data to the secured resource 106, thereby preventing nefarious actors from exposing and/or modifying the sensitive data stored by the secured resource 106. Examples of sensitive data may include personal data (e.g., personally identifying information), trade secrets, medical records, banking information, and other types of data that an individual or enterprise may expect to remain inaccessible to at least one unauthorized individual.

The secured resource 106 may be implemented on one or more devices that are configured to communicate with the primary device 102 over one or more communication networks (not illustrated). As used herein, the term "communication network," and its equivalents, can refer to any network configured to transfer data from one endpoint to another. A communication network may include one or more fiber-optic networks, one or more wired networks, one or more wireless networks, or any combination thereof. Examples of communication networks include, for instance, BLUETOOTH networks, WI-FI networks, 3GPP radio access networks (RANs) (e.g., including an gNodeB, an eNodeB, etc.), core networks (e.g., a 3$^{rd}$ Generation Partnership Project (3GPP) core network, such as a 3$^{rd}$ Generation (3G) core network, an Evolved Packet Core (EPC), or a 5G Core (5GC), etc.), an IP multimedia subsystem (IMS) network, the Internet, or the like. Various elements illustrated in FIG. 1 transmit data to one another via the communication network(s).

Access to the secured resource 106 may be restricted to one or more authorized individuals. An authentication system 108 may control access by the primary device 102 to the secured resource 106. The authentication system 108 may include hardware, software, or a combination thereof. In various implementations, the authentication system 108 may be configured to authenticate devices and/or users prior to the devices connecting to the secured resource 106. In particular, the authentication system 108 may be configured to authenticate the primary device 102 and/or a user of the primary device 102. Once the primary device 102 and/or the user has been authenticated by the authentication system 108, the authentication system 108 may be further configured to enable the primary device 102 to connect to the secured resource 106. When the primary device 102 is connected to the secured resource 106, the primary device 102 may receive data from the secured resource 106 and/or may transmit data to the secured resource 106.

In various implementations, the authentication system 108 may be configured to reauthenticate the primary device 102. For example, the authentication system 108 may authenticate and connect the primary device 102 to the secured resource 106 at a first time, disconnect the primary device 102 from the secured resource 106 at a second time, and reconnect the primary device 102 to the secured resource 106, conditionally, if the primary device 102 and/or a user of the primary device 102 is reauthenticated. By reauthenticating the primary device 102 and/or the user, the authentication system 108 may prevent the chance that an unauthorized user 112 has gained control of the previously authenticated primary device 102 and has accessed the secured resource 108. In various cases, the authentication system 108 reauthenticates the primary device 102 and/or the user of the primary device 102 at a reauthentication interval. The reauthentication interval may be, for instance, 30 minutes, one hour, four hours, twelve hours, one day, or one week. In various examples, the authentication system 108 may prevent the unauthorized user 112 from using the primary device 102 to transmit malicious data to the secured resource 106 and/or to receive sensitive data from the secured resource 106. As used herein, the term "unauthorized user," and its equivalents, may refer to an individual using a device and/or seeking to access a protected resource without permission from an administrator or other entity protecting the resource. In contrast, the term "authorized user," and its equivalents, may refer to an individual using a device and/or seeking to access a protected resource with permission from an administrator or other entity protecting the resource.

In some examples, the authentication system 108 may authenticate the primary device 102 and/or an authorized user 110 of the primary device 102 using MFA. As used herein, the terms "multi-factor authentication," "MFA," and their equivalents, can refer to a process of confirming that a device, the identity of a user of the device, or both, are authorized by requesting and receiving at least two authentication factors from the device, the user, and/or one or more additional devices associated with the user. A user or device is "authorized" when they have permission to access a secure resource. When compared to single-factor authentication, MFA is more likely to successfully authenticate an authorized user or device and to successfully deny an unauthorized user or device. An example MFA process includes requesting a first authentication factor; based on receiving the first authentication factor, requesting a second authentication factor; and based on receiving the second authentication factor, enabling access to a protected resource (e.g., the secured resource 106). The first authentication factor and/or the second authentication factor can be received from a single device or multiple devices associated with the same user. In some cases described herein, the authentication system 108 attempts to confirm one or more authentication factors without specifically requesting them from a user.

The authentication system 108 may request any of a variety of different authentication factors in order to authenticate the primary device 102 and/or the user of the primary device 102. Authentication factors, in some cases, include codes that are known to the authorized user 110. As used herein, the term "code," and its equivalents, can refer to a predetermined combination of alphanumeric characters and/or pixels. A password is an example of a code that can be used as an authentication factor. Other examples of codes include usernames, personal identification numbers (PINs), employee numbers, social security numbers (SSNs), driver's license numbers, Quick Response (QR) codes, and the like.

Examples of authentication factors include evidence of possession of an object associated with the authorized user 110. In some implementations, authentication factors may include evidence of possession of a card, a physical key, a Universal Serial Bus (USB) drive, or the like. For example, the primary device 102 may include a scanner that is configured to scan a code or chip integrated into the card, key, or USB stick.

Certain authentication factors include evidence that a device has a particular context associated with the authorized user 110, such as whether the device is in a particular location associated with the authorized user 110. For example, an authentication factor may be evidence that the primary device 102 is located in the location 104 or a building associated with a home or workplace of the authorized user 110. In some cases, the primary device 106 self-reports its location to the security system 114. For example, the primary device 102 may receive signals from multiple satellites (e.g., Global Positioning System (GPS) satellites) and determine the location of the primary device 102 based on the signals. In some examples, the authentication system 108 receives a signal indicative of the location of the primary device 102. For example, the signal may indicate that the primary device 102 is connected to an access point (AP) associated with a particular coverage area, which may indicate that the primary device 102 is located in the coverage area.

Some authentication factors include evidence of the presence of the authorized user 110. In some implementations, authentication factors may be biometric factors. As used herein, the term "biometric factor," and its equivalents, can refer to evidence of the presence of a body associated with the authorized user 110. For example, a biometric factor may refer to data indicative of the authorized user 110 speaking (e.g., an audible password), data indicative of a fingerprint of the authorized user 110 (e.g., a fingerprint scan), data indicative of an eye of the authorized user 110 (e.g., an iris or retina scan), data indicative of a face of the user (e.g., a facial scan), data indicative of a voice of the authorized user 110, data indicative of a physiological parameter of the authorized user 110, and so on. Examples of physiological parameters include a shape or presence of a portion of the body of the authorized user 110 (e.g., a retina shape), a heart rhythm (e.g., electrocardiogram (ECG)) of the authorized user 110, a blood oxygenation (e.g., pulse oximetry and/or regional oximetry reading) of the authorized user 110, an electroencephalogram (EEG) pattern of the authorized user 110, a pulse rate of the authorized user 110, a body temperature of the authorized user 110, a blood pressure of the authorized user 110, and the like. The authentication system 108 may recognize a biometric factor by performing techniques such as voice recognition, fingerprint recognition, facial recognition, physiological parameter recognition, and the like.

In various examples, the authentication system 108 may request authentication factors from the primary device 102 and/or the authorized user 110. In some cases, the authentication system 108 receives at least one of the authentication factors from the primary device 102. According to some implementations, the authentication system 108 receives at least one of the authentication factors from a secondary device. As used herein, the term "secondary device," and its equivalents, may refer to a device that is registered or otherwise associated with a user seeking to access a protected resource via a primary device, wherein the secondary device is not the primary device. For example, the authentication system 108 may store data indicating that the secondary device is registered to an authenticated user.

Although MFA can be used to protect sensitive data in the secured resource 106, MFA can be taxing on individual users. For example, if the authentication system 108 frequently prompts the authorized user 110 for authentication factors, the authorized user 110 is frequently distracted from other tasks and can become irritated with the frequent intervention required to access the shared resource 106. Thus, it would be advantageous if the authentication system 108 could frequently confirm that the authorized user 110 is operating the primary device 102 without requiring frequent intervention by the authorized user 110.

In various implementations described herein, these and other goals are achieved by utilizing wearable and/or implantable devices as secondary devices for MFA.

For example, the authorized user 110 is associated with one or more wearable devices, such as a smartwatch 114 and smart glasses 116. As used herein, the term "wearable device," and its equivalents, refers to a computing device that operates while disposed on a user. Other types of wearable devices that may be associated with the authorized user 110 include smart clothing (e.g., a smart shirt), a smart bag (e.g., a smart backpack), a Holter monitor, and so on. In various implementations, each wearable device may include at least one processor configured to perform operations, as well as at least one transceiver that enables the wearable device to communicate with the authentication system 108.

In some implementations, the authorized user 110 is associated with an implantable device 118. As used herein, the term "implantable device," and its equivalents, refers to a computing device that is disposed at least partially under the skin of the user. For example, the implantable device 118 may be a cardiac pacemaker, a prosthetic device, a neural implant, or the like. The implantable device 118 may include at least one processor configured to perform operations, as well as at least one transceiver that enables the implantable device to communicate with the authentication system 108.

In various examples, the smartwatch 114, smart glasses 116, implantable device 118, or a combination thereof is configured to confirm that it is being worn by the authorized user 110. Each one of the smartwatch 114, smart glasses 116, and the implantable device 118 may include a sensor configured to detect at least one physiological parameter from the authorized user 110. As used herein, the term "physiological parameter," and its equivalents, may refer to a signal that is output or otherwise detected from the body of an individual. By detecting the physiological parameter(s), the smartwatch 114, the smart glasses 116, and the implantable device 118 may determine that they are being worn by a wearer.

The physiological parameter(s), in some cases, may be a biometric factor for MFA. It may be confirmed that the smartwatch 114, the smart glasses 116, and the implantable device 118 are specifically being worn by the authorized user 110, and not some other individual. In various cases, memory may store a biometric signature that is specific to the authorized user 110. For example, the biometric signature may indicate that the authorized user 110 has a benign heart arrhythmia. The identity of the authorized user 110 may be confirmed by determining that an ECG detected by the smartwatch 114, the smart glasses 116, or the implantable device 118 has the benign heart arrhythmia. In some cases, the biometric signature may indicate a retina shape of the authorized user 110, and the identity of the authorized user 110 may be confirmed by determining that a retina scan detected by the smart glasses 116 matches the retina shape. In various implementations, the authentication system 108, the smartwatch 114, the smart glasses 116, the implantable device 118, or a combination thereof may confirm the identity of the wearer as the authorized user 110. For example, the authentication system 108 may store the biometric signature; the smartwatch 114, the smart glasses 116, the implantable device, or any combination thereof, may transmit a report to the authentication system 108 indicating the detected physiological parameter(s); and the authentication system 108 may compare the physiological parameter (s) to the biometric signature.

However, even if the authorized user 110 has been confirmed to be wearing the smartwatch 114, the smart glasses 116, and the implantable device 118, it may still be possible that the authorized user 110 is not operating the primary device 102. To confirm that the authorized user 110 is operating the primary device 102, the smartwatch 114, the smart glasses 116, the implantable device 118, or any combination thereof may further detect an output signal from the primary device 102. In various cases, the output signal may be detectable within the location 104, and not detectable outside of the location 104. In some cases, the primary device 102 may produce the output signal in response to an instruction from the authentication system 108. In various cases, the output signal may indicate a code, which could be specified by the authentication system 108. The authentication system 108 may determine that the output signal has been received by the smartwatch 114, the smart glasses 116, or the implantable device 118 by receiving an indication of the code from smartwatch 114, the smart glasses 116, or the implantable device 118.

In some implementations, the output signal is a wireless signal. For instance, the primary device 102 may include a keyboard that outputs a near field communication (NFC) signal indicating the code. When the authorized user 110 is operating the keyboard, the smartwatch 114 may be within a few centimeters of the keyboard, and may therefore detect the NFC signal. Any type of wireless signal can be an output signal produced by the primary device 102. For example, the implantable device 118 may detect a Bluetooth signal indicating the code that is output by the primary device 102.

In various cases, the output signal is a visual signal. For instance, the primary device 102 may include a display that visually outputs the code (e.g., as a Quick Response (QR) code, barcode, or other encoded visual symbol). The smart glasses 116 may include a camera that detects the code by capturing an image of the display of the primary device 102 when the authorized user 110 is facing the display.

In some examples, the output signal is an audible signal. For instance, the primary device 102 may include a speaker configured to output a sound that encodes the code. In a specific example, the speaker outputs the code in Morse code. The smartwatch 114 may include a microphone configured to detect the sound.

According to some cases, the output signal is a haptic signal. In some cases, the primary device 102 includes a component (e.g., a mouse) that indicates the code by vibrating. The smartwatch 114, for instance, may include an accelerometer configured to detect the vibration of the component.

In various implementations, the determination that the authorized user 110 is wearing the smartwatch 114, the smart glasses 116, and/or the implantable device 118 as well as the determination that the smartwatch 114, the smart glasses 116, and/or the implantable device 118 has detected the output signal from the primary device 102, may constitute an authentication factor for MFA. In some cases, the authentication system 108 may require that the physiological parameter(s) and the output signal be detected within a threshold amount of time (e.g., ten seconds). Notably, this authentication factor does not necessarily require specific behavior from the authorized user 110. Thus, in various cases, the authorized user 110 is not prompted to input this authentication factor. Accordingly, the detection of this authentication factor may be transparent to the authorized user 110. The authentication system 108 may perform MFA based on this authentication factor as well as at least one additional authentication factor detected by the primary device 102.

Figure 1B:
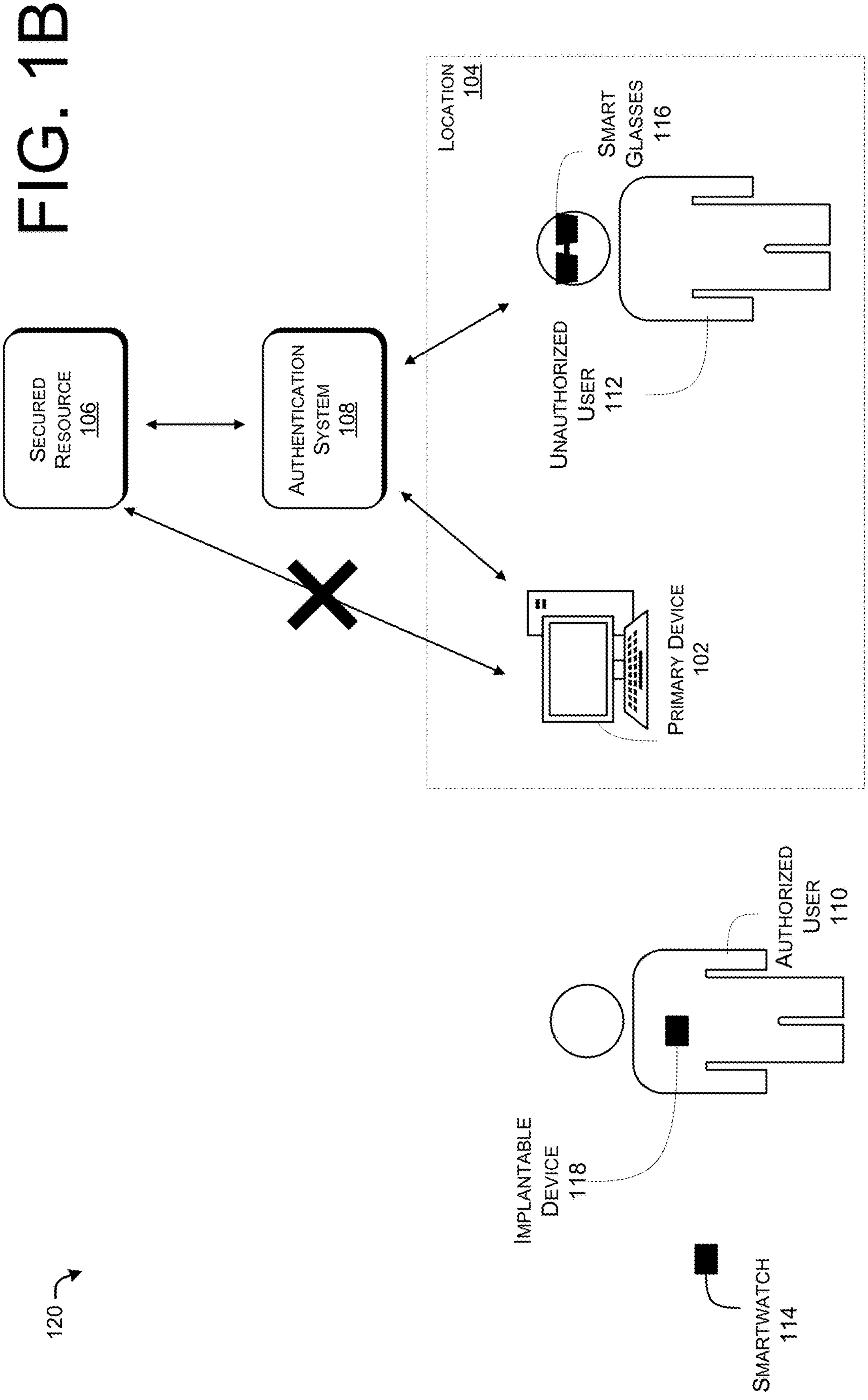
FIG. 1B illustrates an example environment in which an authentication system prevents a primary device from transmitting data to and/or receiving data from a secured resource.

FIG. 1B illustrates an example environment 120 in which the authentication system 108 prevents the primary device 102 from transmitting data to and/or receiving data from the secured resource 106. For example, the unauthorized user 112 may attempt to access the secured resource 106 by operating the primary device 102. The authentication system 108 may determine that the authorized user 110 is not operating the primary device 102, and may therefore prevent the primary device 102 from accessing the secured resource 106, using one or more techniques.

For example, the authentication system 108 may determine that the smartwatch 114 associated with the authorized user 110 is not currently being worn. In some cases, the authentication system 108 may transmit an instruction to the smartwatch 114 to detect a physiological parameter. However, neither the authorized user nor the unauthorized user 110 are wearing the smartwatch 114. The smartwatch 114 may therefore be unable to detect a physiological parameter. As a result, the authentication system 108 and/or the smartwatch 114 may determine that the smartwatch 114 is not currently being worn by a user. The authentication system 108 may prevent the primary device 102 from accessing the secure resource 106 based on determining that the smartwatch 114 is not currently worn by a user.

In some instances, the unauthorized user 112 may be wearing the smart glasses 116 associated with the authorized user 110. The smart glasses 116 may detect a physiological parameter of the unauthorized user 112, which may confirm that the smart glasses 116 are being worn by a user. In addition, the smart glasses 116 may be in the location 104, and may therefore detect the output signal from the primary device 102. However, the authentication system 108 and/or the smart glasses 116 may determine that the physiological parameter detected from the authorized user 112 does not match the biometric signature of the authorized result 110. As a result, the authentication system 108 and/or the smart glasses 116 may determine that the authorized user 110 is not wearing the smart glasses 116, and may block the primary device 102 from accessing the shared resource 106 on at least this basis.

According to some cases, the authentication system 108 may determine that the authorized user 110 is not in the location 104 by communicating with the implantable device 118. The implantable device 118 may detect a physiological parameter from the authorized user 110. In some cases, the authentication system 108 and/or the implantable device 118 may determine that the physiological parameter matches the biometric signature of the authorized user 110. However, because the authorized user 110 and the implantable device 118 are positioned outside of the location 104, the implantable device 118 may be unable to detect the output signal from the primary device 102. The implantable device 118 may indicate the failure to detect the output signal to the authentication system 108. The authentication system 108 may therefore determine that the authorized user 110 is not currently using the primary device 102, and may prevent the primary device 102 from accessing the secured resource 106 for at least this reason.

In various implementations, multiple secondary devices can be used for authenticating a user. For example, in some cases, a security policy associated with the secured resource 106 requires confirmation of biometric factors detected by at least two of the smartwatch 114, smart glasses 116, or implantable device 118 before the authentication system 108 enables the primary device 102 to access the secured resource 106.

In various implementations described with reference to FIG. 1, the authentication system 108 confirms that the authorized user 110 is within the location 104 as a condition to providing access to the secured resource 106 via the primary device 102. However, in some cases, the authentication system 108 confirms other types of context associated with the authorized user 110. For instance, the authentication system 108 can confirm that the authorized user 110 is attempting to access the secured resource 106 within normal working hours (e.g., between 9 AM and 5 PM on a weekday) of the authorized user 110, within normal waking hours of a time zone of the authorized user 110 (e.g., between 5 AM and midnight), or the like, prior to enabling the primary device 102 to access the secured resource 106.

Figure 2A:
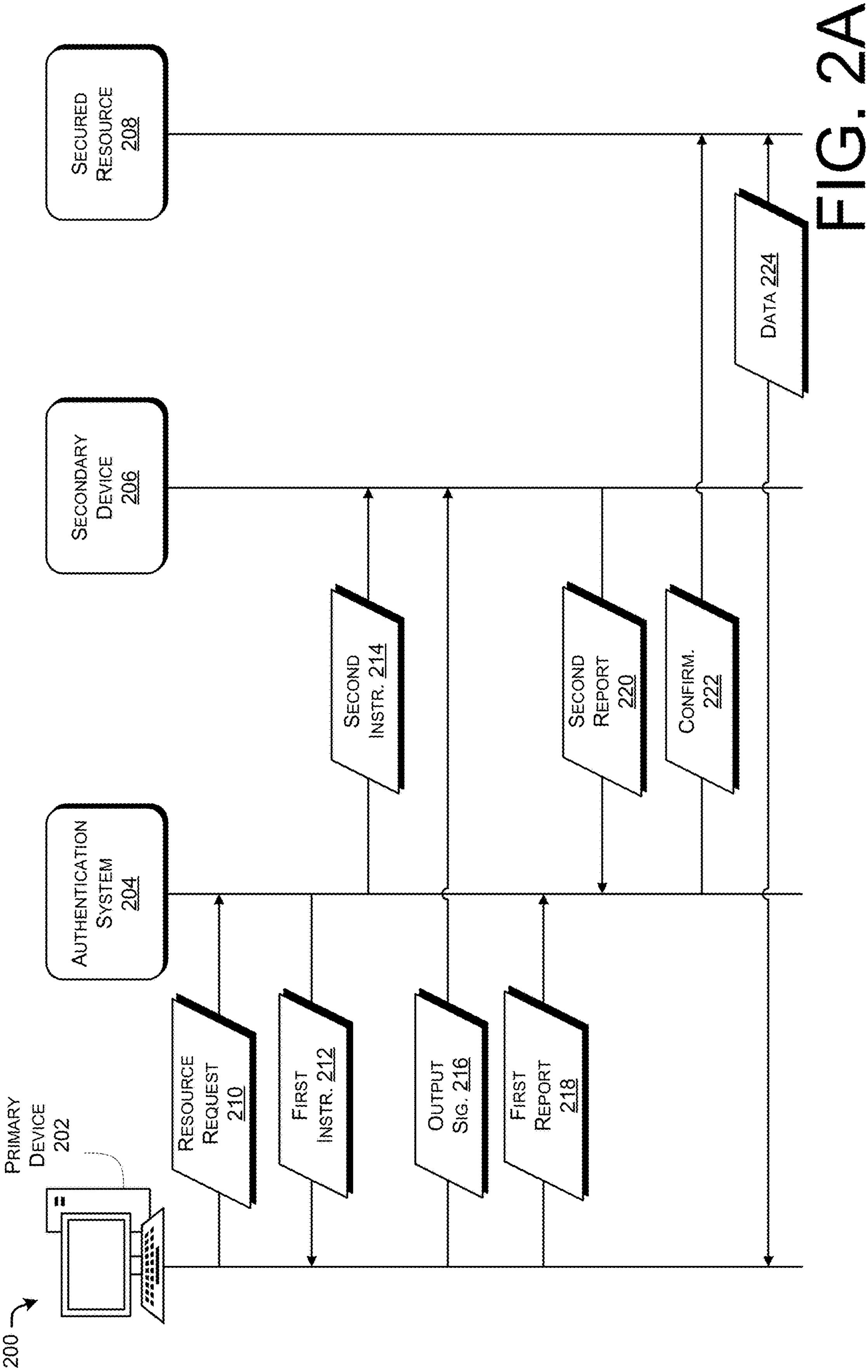
FIGS. 2A and 2B illustrate example signaling for performing MFA in accordance with various implementations of the present disclosure.
Figure 2B:
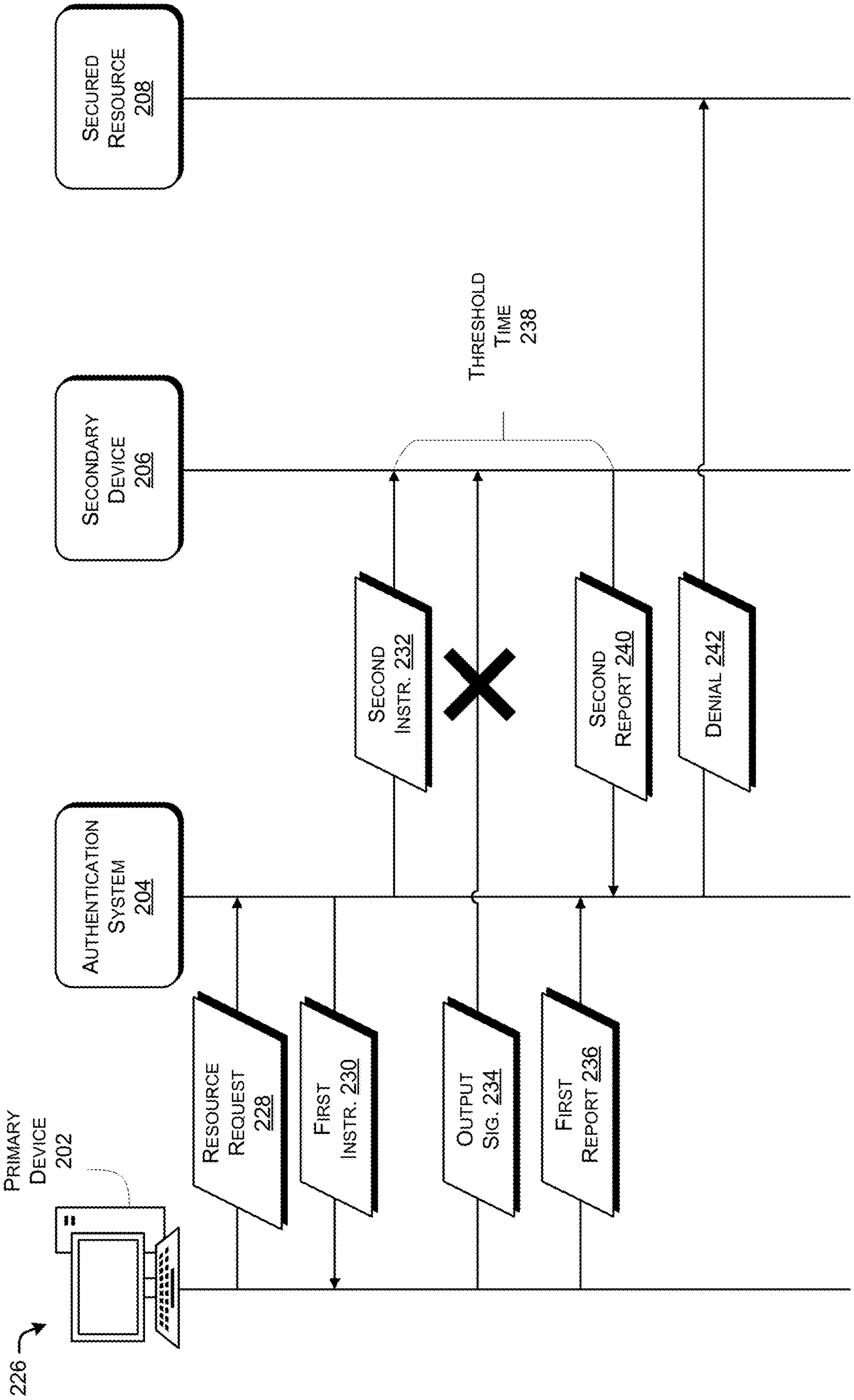

FIGS. 2A and 2B illustrate example signaling for performing MFA in accordance with various implementations of the present disclosure. The signaling is between a primary device 202, an authentication system 204, a secondary device 206, and a secured resource 208. In various cases, the secondary device 206 is a wearable and/or implantable device, such as the smartwatch 114, the smart glasses 116, or the implantable device 118 discussed above with reference to FIGS. 1A and 1B.

FIG. 2A illustrates signaling 200 in which the primary device 202 and/or a user of the primary device 202 is authenticated, such that the primary device 202 is allowed to access the secured resource 208.

The primary device 202 may transmit a resource request 212 that is received by the authentication system 204. The resource request 212 may include a request for data from the secured resource 208 and/or a request transmit data to the secured resource 208. In some cases, the authentication system 204 intercepts the resource requestion 210. Based on the resource request 210, the authentication system 204 may initiate MFA of the primary device 202 and/or a user of the primary device 202.

The authentication system 204 may transmit a first instruction 212 to the primary device 202. The first instruction 212 may be an instruction to obtain a first authentication factor from the primary device 202 and/or the user. In various implementations, the first authentication factor includes at least one of a code, evidence of possession of a card, evidence of possession of a physical key, evidence of possession of a USB drive, evidence of possession of another device (e.g., a response to a push notification), or a biometric factor.

The authentication system 204 may transmit a second instruction 214 to the secondary device 206. The second instruction 214, for example, may be an instruction to confirm that the secondary device 206 is being worn by an authorized user. For instance, the secondary device 206 may detect at least one physiological parameter of the user. In various cases, the secondary device 206 at least attempts to detect the physiological parameter(s) without prompting or requiring manual intervention on the part of the user.

Based on receiving the first instruction 212, the primary device 202 may transmit an output signal 216 to the secondary device 206. The output signal 216 may be a wireless signal, a visual signal, an auditory signal, a haptic signal, or a combination thereof. According to various examples, the output signal 216 indicates a code. In some cases, the code was specified in the first instruction 212. In some cases, the first instruction 212 directs the primary device 202 to output the output signal 216. In some implementations, the second instruction 214 directs the secondary device 206 to detect the output signal 216.

The primary device 202 may transmit a first report 218 to the authentication system 204. In some cases, the first report 218 may indicate that the primary device 202 and/or the user satisfy a first authentication factor. In some cases, the first report 218 may also confirm that the primary device has output the output signal 216. According to some examples, the first report 218 indicates the code of the output signal 216.

The secondary device 206 may transmit a second report 220 to the authentication system 204. In various cases, the second report 220 may indicate that the secondary device 206 has detected the physiological parameter(s) of the user and/or that the physiological parameter(s) match a biometric signature of the user. According to some examples, the second report 220 further indicates that the secondary device 206 has received the output signal 216. For instance, the second report 220 indicates the code of the output signal 216.

Based on receiving the first report 218 and the second report 220, the authentication system 204 may transmit a confirmation 222 to the secured resource 208. Based on the shared resource 208 receiving the confirmation 222 from the authentication system 204, the primary device 202 and the secured resource 208 may exchange data 224.

FIG. 2B illustrates example signaling 226 in which a user is not authenticated and is consequently denied access to the secured resource 208. The primary device 202 may transmit a resource request 228 that is received by the authentication system 204. The resource request 228 may include a request for data from the secured resource 208 and/or a request transmit data to the secured resource 208. In some cases, the authentication system 204 intercepts the resource request 228. Based on the resource request 210, the authentication system 204 may initiate MFA of the primary device 202 and/or a user of the primary device 202.

The authentication system 204 may transmit a first instruction 230 to the primary device 202. The first instruction 230 may be an instruction to obtain a first authentication factor from the primary device 202 and/or the user. In various implementations, the first authentication factor includes at least one of a code, evidence of possession of a card, evidence of possession of a physical key, evidence of possession of a USB drive, evidence of possession of another device (e.g., a response to a push notification), or a biometric factor.

The authentication system 204 may transmit a second instruction 232 to the secondary device 206. The second instruction 232, for example, may be an instruction to confirm that the secondary device 206 is being worn by an authorized user. For instance, the secondary device 206 may detect at least one physiological parameter of the user.

Based on receiving the first instruction 230, the primary device 202 may transmit an output signal 234 to the secondary device 206. The output signal 234 may be a wireless signal, a visual signal, an auditory signal, a haptic signal, or a combination thereof. According to various examples, the output signal 234 indicates a code. In some cases, the code was specified in the first instruction 212. In some cases, the first instruction 212 directs the primary device 202 to output the output signal 216. In some implementations, the second instruction 214 directs the secondary device 206 to detect the output signal 234.

The primary device 202 transmits a first report 236 to the authentication system 204. In some cases, the primary device 202 may receive the requested authentication factor from the user and may indicate the authentication factor in the first report 236. In some examples, the primary device 202 may not receive the authentication factor from the user (e.g., within a threshold amount of time) and may indicate the failure to receive the authentication factor in the first report 236. The first report 236, in some examples, may further indicate the code that is indicated by the output signal 234.

However, the secondary device 206 may not detect the output signal 234. For example, the secondary device 206 may be positioned in a different location than the primary device 202, such as greater than a threshold distance (e.g., 10 feet, 30 feet, or the like) from the primary device 202. In various cases, the secondary device 206 may wait a threshold time 238 after receiving the second instruction 232 without receiving the output signal 234. Once the threshold time 238 has elapsed, the secondary device 206 may transmit a second report 240 to the authentication system 204. The second report 240, in various examples, indicates that the output signal 234 with the appropriate code was not received by the secondary device 206.

Based on the second report 240, the authentication system 204 may deny the primary device 202 (and the user of the primary device 202) access to the shared resource 208. Additionally, in various implementations in which the first report 236 indicates the authentication factor was not received by the primary device 202, the authentication system 204 may deny the primary device 202 access to the secured resource 208. In various implementations, the authentication system 204 may transmit a denial 242 to the shared resource 208 indicating that the primary device 202 has been denied access to the secured resource 208. Based on receiving the denial 242, the secured resource 208 may refrain from transmitting data to the primary device 202 and/or may refrain from accepting data from the primary device 202. In some implementations, the authentication system 204 may further transmit a message to the primary device 202 indicating that the primary device 202 has been denied access to the secured resource 208. Accordingly, the secured resource 208 may refrain from transmitting data to or receiving data from the primary device 202.

Figure 3:
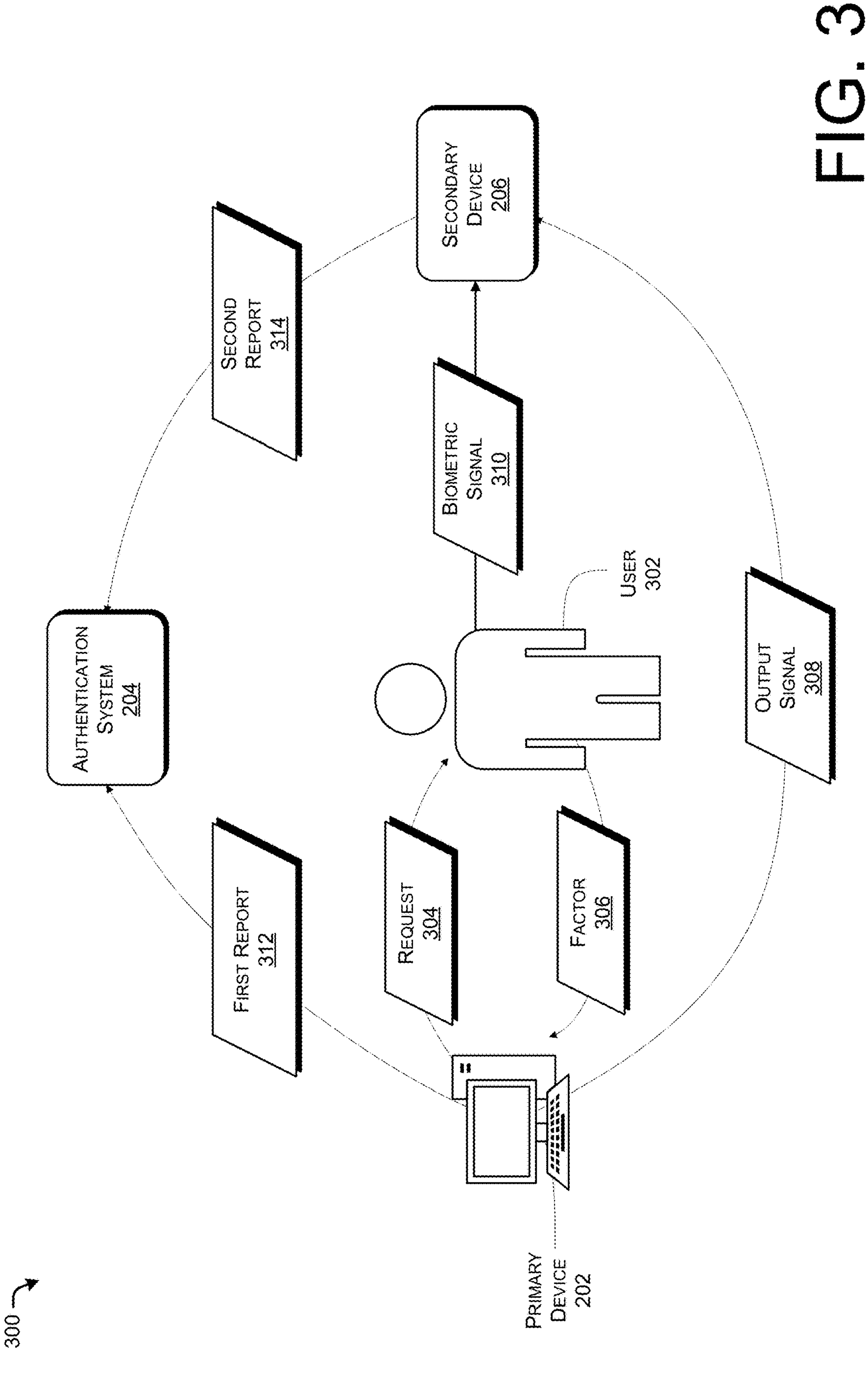
FIG. 3 illustrates example signaling involving a user at least attempting to access a secured resource via the primary device.

FIG. 3 illustrates example signaling 300 involving a user 302 at least attempting to access a secured resource via the primary device 202. As shown, the signaling 300 is between the primary device 202, the authentication system 204, and the secondary device 206 described above with reference to FIGS. 2A and 2B.

In various implementations, the primary device 202 outputs a request 304 to the user 302. The request 304 may be for at least one authentication factor 306. The authentication factor 306, for example, may be In various implementations, the first authentication factor includes at least one of a code, evidence of possession of a card, evidence of possession of a physical key, evidence of possession of a USB drive, evidence of possession of another device (e.g., a response to a push notification), or a biometric factor. In response to receiving the request 304, the user 302 may provide the factor 306 to the primary device 202.

In addition, the primary device 202 may output an output signal 308 that is detected by the secondary device 206. The output signal 308, for instance, may be the output signal 216 described above with reference to FIG. 2A. In various implementations, the output signal 308 is a visual signal, an audible signal, a haptic signal, or any combination thereof. In some cases, the output signal includes a wireless signal (e.g., an electromagnetic and/or ultrasonic signal). The output signal 308 may indicate a code that is identified by the secondary device 206.

The secondary device 206 may also detect a biometric signal 310 from the user 302. The biometric signal 310 may include a physiological parameter that is specific to the user 302. For example, the biometric signal 310 indicates at least one of an ECG, a pulse rate, an EEG, a blood pressure, a blood oxygenation, a voice, a retina shape, a body temperature, a body movement, an electrolyte level (e.g., in blood or sweat), or any other physiological parameter that is associated with the user 302. In various implementations, the secondary device 206 may determine whether it has detected the output signal 308 and the biometric signal 310 within a threshold time of each other. The threshold time, for example, may be one second, ten seconds, thirty seconds, one minute, or the like.

The primary device 202 and the secondary device 206 may respectively transmit reports to the authentication system 204 indicating whether authentication factors have been successfully received from the user 302. The primary device 202 may transmit a first report 312 to the authentication system 204. The first report 312 may indicate the factor 306 received from the user 302 and/or whether the factor 306 matches a predetermined factor associated with an authorized user.

The secondary device 206 may transmit a second report 314 to the authentication system 204. The second report 314 may indicate the biometric signal 310 received from the user 302 and/or whether the biometric signal 310 matches a predetermined biometric signal associated with the authorized user. In various cases, the second report 314 may indicate the output signal 308 and/or the code indicated by the output signal 308. In various implementations, the second report 314 may indicate a first time at which the output signal 308 was detected by the secondary device 206, a second time at which the biometric signal 310 was detected by the secondary device 206, a time interval between the first time and the second time, an indication of whether the time interval is less than a threshold time interval, or any combination thereof.

The authentication system 204 may determine whether to enable the primary device 202 to access the secured resource based on the first report 312 and/or the second report 314. In various implementations, the authentication system 204 may enable the primary device 202 to exchange data with the secured resource based on determining that the factor 306 is associated with the authorized user, determining that the secondary device 206 received the output signal 308, determining that the biometric signal 310 is associated with the authorized user, determining that the secondary device 206 received the output signal 308 and the biometric signal 310 within a threshold time period of each other, or any combination thereof. The authentication system 204 may prevent the primary device 202 from exchanging data with the secured resource based on determining that the factor 306 is not associated with the authorized user, determining that the output signal 308 was not received by the secondary device 206, determining that the biometric signal 310 is not associated with the authorized user, determining that the output signal 308 and the biometric signal 310 were not received within a threshold time period of one another, or any combination thereof.

Figure 4:
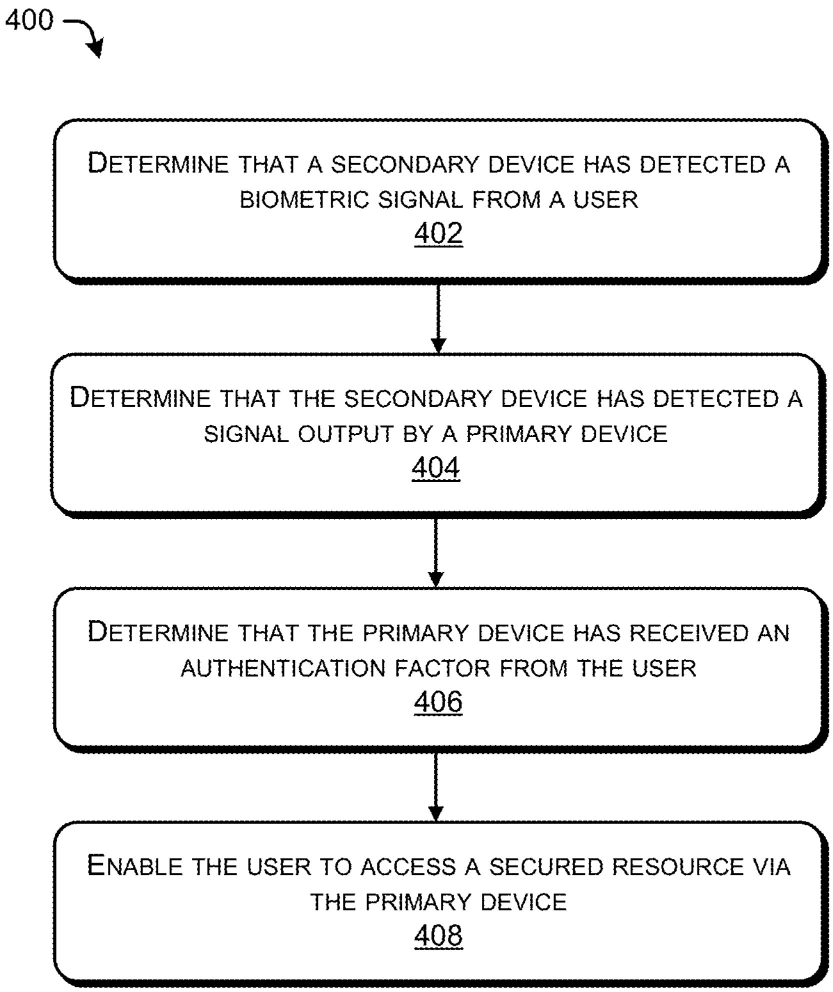
FIG. 4 illustrates an example process for performing MFA using a wearable device.

FIG. 4 illustrates an example process 400 for performing MFA using a wearable device. The process 400 may be performed by an entity, such as at least one processor and/or an authentication system (e.g., the authentication system 108 or 204 described above).

At 402, the entity determines that a secondary device has detected a biometric signal from a user. The secondary device, in various examples, is a wearable device and/or an implantable device. For instance, the wearable device is a watch, smart glasses, smart clothing, or some other computing device that is disposed on and/or in the body of the user. The biometric signal indicates a physiological parameter of the user. For example, the biometric signal indicates at least one of a retina scan, a pulse, an ECG, a blood oxygenation, a heart rhythm, or a voice of the user. In various implementations, the entity may determine that the biometric signal detected from the user matches a predetermined biometric signature associated with an authorized user. Based on the biometric signal, the entity may determine that the secondary device is currently worn by the user (e.g., by detecting the biometric signal) and/or that the user is authorized (e.g., by determining that the biometric signal matches the biometric signature).

At 404, the entity determines that the secondary device has detected a signal output by a primary device. In some examples, the signal is a visual signal that the secondary device detects using a camera. For instance, the signal may be a QR code displayed by the primary device and detected by the secondary device. In some cases, the signal is an audible signal that the secondary device detects using a microphone. In some implementations, the signal is a haptic signal (e.g., a vibration pattern) detected by the secondary device using an accelerometer. In some implementations, the entity determines that the signal detected by the secondary device encodes a code that matches a predetermined code associated with the primary device.

At 406, the entity determines that the primary device has received an authentication factor from the user. In some cases, the primary device has requested the authentication factor from the user. The authentication factor, for instance, may include at least one of a code, evidence of possession of a card, evidence of possession of a physical key, evidence of possession of a USB drive, evidence of possession of another device (e.g., a response to a push notification), or a biometric factor. The authentication factor may be different than the biometric factor detected by the secondary device.

At 408, the entity enables the user to access a secured resource via the primary device. For example, the entity may transmit a signal to the secured resource (or a firewall protecting the secured resource) that instructs the secured resource to accept data transmitted from the primary device and/or to transmit data requested by the primary device.

Figure 5:
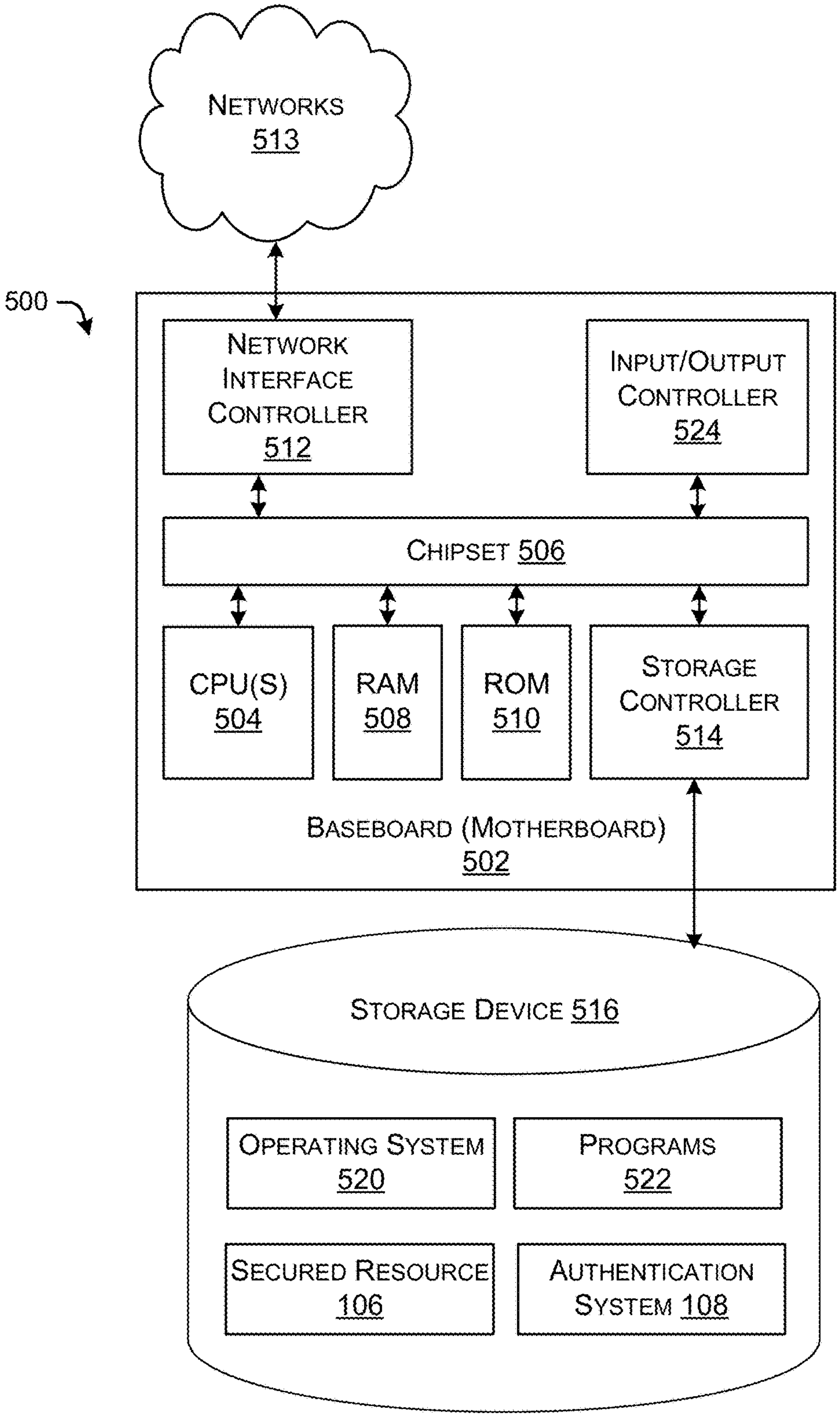
FIG. 5 shows an example computer architecture for a server computer capable of executing program components for implementing the functionality described above.

FIG. 5 shows an example computer architecture for a server computer 500 capable of executing program components for implementing the functionality described above. The computer architecture shown in FIG. 5 illustrates a conventional server computer, workstation, desktop computer, laptop, tablet, network appliance, e-reader, smartphone, or other computing device, and can be utilized to execute any of the software components presented herein.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a random-access memory (RAM) 508, used as the main memory in the computer 500. The chipset 506 can further provide an interface to a computer-readable storage medium such as a read-only memory (ROM) 510 or non-volatile RAM (NVRAM) for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network, such as the network 513. The chipset 506 can include functionality for providing network connectivity through a network interface controller (NIC) 512, such as a gigabit Ethernet adapter. The NIC 512 is capable of connecting the computer 500 to other computing devices over the network 513. It should be appreciated that multiple NICs 512 can be present in the computer 500, connecting the computer 500 to other types of networks and remote computer systems. In some instances, the NICs 512 may include at least on ingress port and/or at least one egress port.

The computer 500 can be connected to a storage device 516 that provides non-volatile storage for the computer. The storage device 516 can store an operating system 518, programs 520, and data, which have been described in greater detail herein. The storage device 516 can be connected to the computer 500 through a storage controller 522 connected to the chipset 506. The storage device 516 can consist of one or more physical storage units. The storage controller 516 can interface with the physical storage units through a serial attached small computer system interface (SCSI) (SAS) interface, a serial advanced technology attachment (SATA) interface, a fiber channel (FC) interface, or other type of interface for physically connecting and transferring data between computers and physical storage units.

The computer 500 can store data on the storage device 516 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 516 is characterized as primary or secondary storage, and the like.

For example, the computer 500 can store information to the storage device 516 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 516 by detecting the physical states or characteristics of one or more particular locations within the physical storage units.

In addition to the mass storage device 516 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by any network node described herein may be supported by one or more devices similar to computer 500. Stated otherwise, some or all of the operations performed by a network node may be performed by one or more computer devices 500 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 516 can store an operating system 520 utilized to control the operation of the computer 500. According to one embodiment, the operating system comprises the LINUX™ operating system. According to another embodiment, the operating system includes the WINDOWS' SERVER operating system from MICROSOFT Corporation of Redmond, Washington. According to further embodiments, the operating system can comprise the UNIX™ operating system or one of its variants. It should be appreciated that other operating systems can also be utilized. The storage device 516 can store other system or application programs and data utilized by the computer 500.

In one embodiment, the storage device 516 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various processes described above with regard to FIGS. 1-4. The computer 500 can also include computer-readable storage media having instructions stored thereupon for performing any of the other computer-implemented operations described herein.

As illustrated in FIG. 5, the storage device 516 stores programs 522, which may include one or more processes, as well as the secured resource 106 and/or the authentication system 108. The process(es) may include instructions that, when executed by the CPU(s) 504, cause the computer 500 and/or the CPU(s) 504 to perform one or more operations.

The computer 500 can also include one or more input/output controllers 528 for receiving and processing input from a number of input devices, such as a keyboard, a mouse, a touchpad, a touch screen, an electronic stylus, or other type of input device. Similarly, an input/output controller 524 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 6.

In some instances, one or more components may be referred to herein as "configured to," "configurable to,"

"operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on." As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method, comprising:

transmitting, to a primary device, an instruction to output a signal indicating a code;

determining that a secondary device implanted in a body of a user has detected, from the primary device, the signal indicating the code, wherein determining that the secondary device implanted in the body of the user has detected the signal indicating the code comprises determining that the secondary device has detected the signal within a threshold time period of detecting a biometric signal of the user;

determining that the user has confirmed an authentication factor output by the primary device; and enabling the user to access a secured resource via the primary device.

2. The method of claim 1, wherein the secondary device comprises a microphone, and wherein the signal comprises an audible signal output by a speaker of the primary device.

3. The method of claim 1, wherein the method is performed by at least one server that is different than the primary device and different than the secondary device.

4. The method of claim 1, wherein the secondary device comprises a cardiac pacemaker, a prosthetic device, or a neural implant, and/or wherein the signal comprises a near field communication (NFC) signal.

5. The method of claim 1, further comprising:

determining that the secondary device is implanted in the body of the user by:

determining that the secondary device has detected a physiological parameter of the user; and determining that the physiological parameter matches a biometric signature of the user.

6. The method of claim 5, wherein the physiological parameter comprises an electrocardiogram (ECG), a pulse rate, an electroencephalogram (EEG), a blood pressure, a blood oxygenation, a voice, a body temperature, a body movement, a blood electrolyte level, or a sweat electrolyte level.

7. The method of claim 1, wherein the implantable device is configured to be disposed at least partially under skin of the user.

8. A system, comprising:

at least one processor; and one or more non-transitory media storing instructions that, when executed by the system, cause the system to perform operations comprising:

determining, at an authentication system, that a primary device of a user has registered a secondary device to be used for authentication;

receiving, at the authentication system, a request from the primary device for the user to access a secure resource via the primary device;

determining that a user is wearing or has been implanted with a secondary device by:

determining that the secondary device has detected a physiological parameter comprising at least one of a blood pressure, a blood oxygenation, a body temperature, a body movement, a blood electrolyte level, or a sweat electrolyte level; and determining that the physiological parameter matches a biometric signature of the user;

determining a type of an input mechanism with which the secondary device receives data;

determining a signal type of the signal such that the input mechanism is able to receive the signal as data, outputting, from the authentication system and to a primary device, an instruction to output a signal indicating a code, wherein the instruction indicates the signal type for the primary device to use when outputting the signal indicating the code;

receiving, at the authentication system, a message from the secondary device, the message comprising:

a representation of the code indicating that the secondary device detected the signal indicating the code that was output by the primary device; and an indication that the secondary device has utilized an authentication factor associated with user to confirm that the secondary device is located on or implanted in the body of the user; and enabling the user to access the secured resource via the primary device.

9. The system of claim 8, wherein the secondary device comprises a watch, and wherein the signal comprises at least one of a visual signal detected by a camera of the watch, an audible signal detected by a microphone of the watch, or a haptic signal detected by an accelerometer of the watch.

10. The system of claim 8, wherein the secondary device comprises smart glasses, and wherein the signal comprises at least one of a visual signal detected by a camera of the smart glasses or an audible signal detected by a microphone of the smart glasses.

11. The system of claim 8, wherein the secondary device comprises a camera, and wherein the signal comprises a quick response (QR) code output on a display of the primary device.

12. The system of claim 8, wherein the secondary device comprises a microphone, and wherein the signal comprises an audible signal output by a speaker of the primary device.

13. The system of claim 8, wherein the system comprises at least one server that is different than the primary device and different than the secondary device.

14. The system of claim 8, wherein the secondary device comprises an implantable device configured to be disposed at least partially under skin of the user.

15. The system of claim 8, wherein the signal comprises a near field communication (NFC) signal.

16. An authentication system, comprising:

at least one processor; and memory storing instructions that, when executed by the system, cause the system to perform operations comprising:

receiving, from a wearable device, a first signal;

identifying, based on the first signal, a biometric signal that the wearable device has detected from a user, the biometric signal comprising at least one of a blood pressure of the user, a blood oxygenation of the user, a body temperature of the user, a body movement of the user, a blood electrolyte level of the user, or a sweat electrolyte level of the user;

determining that the detected biometric signal matches a predetermined biometric signal associated with the user;

outputting, to a primary device, an instruction to output a second signal indicating a code;

receiving, from the wearable device, a third signal;

determining, based on the third signal, that the wearable device has detected, from the primary device, the second signal indicating the code, wherein determining that the wearable device has detected the second signal indicating the code comprises determining that the wearable device has detected the second signal within a threshold time period of detecting the biometric signal of the user;

receiving, from the primary device, a fourth signal;

determining, based on the fourth signal, that the user has confirmed an authentication factor output by the primary device; and based on determining that the detected biometric signal matches the predetermined biometric signal, determining that the wearable device has detected the second signal, and determining that the user has confirmed the authentication factor, enabling the primary device to access a secured resource.

17. The authentication system of claim 16, wherein the operations further comprise:

receiving, from the primary device, a fifth signal comprising a request to access the secured resource; and based on receiving the fifth signal:

outputting, to the primary device, a sixth signal comprising the instruction; and outputting, to the primary device, a seventh signal comprising a second instruction to request the authentication factor from the user.

18. The authentication system of claim 16 wherein the wearable device comprises a watch or smart glasses.

19. The authentication system of claim 16, wherein the second signal comprises a visual signal output on a display of the primary device.

* * * * *